United States Patent Office 2,919,229
Patented Dec. 29, 1959

2,919,229

N-METHYLGLUCAMINE SALTS OF ALPHA-NAPHTHYL AND ACYL 1,3-INDANDIONE AND METHODS OF USING SAME

Louis Freedman, Mount Vernon, and Seymour L. Shapiro, Hastings-on-Hudson, N.Y., and Karl Geiger, Passaic, N.J., assignors to U. S. Vitamin Corporation, a corporation of Delaware No Drawing. Application November 22, 1957
Serial No. 698,038

7 Claims. (Cl. 167—65)

This invention relates to therapeutic agents for reducing the coagulability of blood, that is, lowering the prothrombin levels and particularly to N-methylglucamine salts of alpha-naphthyl and certain acyl 1,3-indandiones.

We have discovered that these N-methylglucamine salts are very soluble in water, stable, non-hygroscopic, and very effective anticoagulants with desirably large differences between the sizes of the effective and the lethal dosages.

Representative of our new compounds is the salt of N-methylglucamine with the enol form of 2-(alpha-naphthyl)-1,3-indandione, this salt being of the formula below:

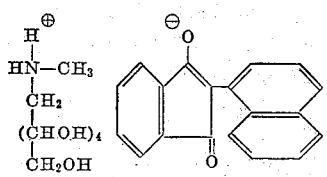

Here the amine moiety is shown as the positive ion, the indandione part as the negative ion.

The acyl compounds have a large acyl group (RCO—) in place of the 2-ring (naphthyl) group at the right in formula above

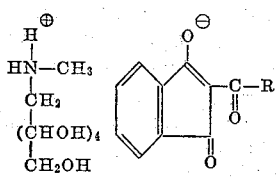

where R is a saturated aliphatic hydrocarbon radical having from ten to sixteen carbon atoms.

In the practice of oral anticoagulant therapy, it is recognized that rigorous supervision of patients is required. The continued daily use of anticoagulant coupled with occasional absorption of excess anticoagulant can so depress the clotting capacity of the blood that fatal bleeding may result. Such intrinsic hazards of anticoagulant therapy are, of course, rigorously guarded against during clinical management and hospitalized patients are watched carefully, with frequent testing of the prothrombin time, to prevent such bleeding incidents.

With the increasing use of anticoagulant therapy as a prophylactic therapeutic procedure, it is important to assess the factors which contribute to the unpredictable responses.

We consider that factors contributing to irregularities of response include the use of indandione type anticoagulants in the water insoluble and non-enolate form. Ingestion of tablets of such material may lead to conditions in the stomach which will vary and depend partly on the quantity and time of the patients' food intake and the measure of the insolubility of the drug. The result is unpredictable absorption in the stomach and intestines with consequent irregularity of the anticoagulant response.

Our water soluble N-methylglucamine salts of enol form of the indandione derivative, on oral ingestion, are dissolved to form a solution in the stomach and become distributed therein by peristaltic action. As the drug is dissolved, the hydrochloric acid of the gastric juice precipitates the free (non-salt) form of the anticoagulant as a hydrated mass, in contrast to the granular form obtained by disintegration of a tablet of an insoluble indandione derivative. This hydrated, relatively uniform anticoagulant, on entering the intestines gives more predictable absorption and consequent anticoagulant control.

The amine anticoagulant salts are prepared as illustrated in the following examples.

In general, the N-methylglucamine salts are prepared by reaction of the indandione derivative that contains the alpha-naphthyl or the acyl radical that is to appear in the final salt. The reaction is best effected in a solvent, such as a low boiling alcohol or water and suitably methanol, and in any event with n-methylglucamine. Boiling is used to advantage and complete solution of the resulting salt in methanol or the like is obtained. The reaction mixture is treated with carbon, filtered and the methanol removed in vacuo. The salt formed has a deep color ranging from yellow to red. The salt is recrystallized from a solvent such as isopropanol. In these salts in all cases, the indandione moiety is in the enolate form.

EXAMPLE 1

2-(alpha-naphthyl)-1,3-indandione was prepared as follows: To a solution of 1.15 g. of sodium in 25 ml. of ethanol there was added 6.7 g. of phthalide and 7.8 g. of alpha-napththaldehyde. The reaction mixture was heated on the steam bath for 30 minutes. Water was then added and the ethanol removed in vacuo. The aqueous residue was then diluted with water and washed several times with ether. Finally, hydrochloric acid was added to the aqueous phase to precipitate the product which was then separated by filtration, dried and recrystallized from isopropanol. The product melted at 203°–206° C.

2-(alpha-naphthyl)-1,3-indandione N-methylglucamine salt was then made. A suspension of 5.4 g. of 2-(alpha-naphthyl)-1,3-indandione as made above was treated in 20 ml. of methanol with 3.9 g. of N-methylglucamine. The reaction mixture was heated to boiling, yielding complete solution. After mixing with carbon as filter aid and filtering, the methanol was evaporated and the residue, a deep orange-red product and the salt desired, was dried in vacuo. The salt melted at 90°–94° C.

EXAMPLE 2

2-lauroyl-1,3-indandione was prepared as follows: To a suspension of 5.4 g. of sodium methylate in 100 ml. of benzene were added 20 g. of dimethyl phthalate and 20 g. of methyl undecyl ketone. The reaction mixture was stirred and refluxed for 24 hours. The benzene and unreacted ketone were then removed by distillation. The distillation residue was diluted with 1.51 liters of water, 200 ml. of ether then added, the solution acidified with hydrochloric acid, and the reaction mixture shaken in a separatory funnel. The ethereal phase, on treatment with 2% aqueous sodium hydroxide solution, yielded a crystalline mass of the insoluble sodium salt of the 2-lauroyl- 1,3-indandione. The sodium salt was recrystallized from boiling water and then dried by azeotropic distillation with benzene. The yellow crystalline sodium salt was filtered from the benzene and dried, there being obtained 6.5 g., M.P. 156°–158° C. A suspension of 15 g. of the sodium salt above in 125 ml. of water and 125 ml. of ether was acidified with hydrochloric acid and shaken. The ethereal phase was separated, dried over magnesium sulfate, filtered, the ether evaporated, and the residue 2-lauroyl-1,3-indandione recrystallized from methanol. The yield was 12.4 g. and the M.P. 51°–52° C.

The resulting 2-lauroyl-1,3-indandione 8.2 g. and 5.9 g. of N-methylglucamine were mixed and processed with the technique of Example 1. They gave a yellow 2-lauroyl-1,3-indandione N-methylglucamine salt which, recrystallized from isopropyl alcohol, melted at 89°–91° C.

EXAMPLE 3

*2-palmitoyl-1,3-indandione.*—The sodium salt of this compound was made as in Example 2 except that the ketone used was 25.6 g. of methyl pentadecyl ketone, there being obtained 10.2 g. of the desired sodium salt of M.P. 191°–192° C.

The sodium salt in turn was converted to the 2-palmitoyl-1,3-indandione also by the acidification procedure of Example 2, there being obtained from 15 g. of the sodium salt 10.7 g. of the pale yellow indandione product of M.P. 45°–46° C.

*2 - palmitoyl - 1,3 - indandione - N - methylglucamine salt.*—Following the procedure of the last part of Example 2, 8.2 g. of 2-palmitoyl-1,3-indandione and 4.9 g. of N-methylglucamine were mixed and processed. The yellow product was recrystallized from isopropyl alcohol. It melted at 82°–85° C. It was the desired salt.

EXAMPLE 4

Following the conditions of Example 2 there was prepared 2-(decanoyl)-1,3-indandione N-methylglucamine salt of yellow color and M.P. 127°–128° C., the ketone of Example 2 being substituted by methyl nonyl ketone in equivalent amount.

The desirable solubility characteristics of our amine salts will be seen from Table I in which the approximate solubility of various salts herein prepared are expressed in grams per 100 ml. of water.

*Table I*

| Derivative of 1,3-Indandione | Salt | Solubility at 25° C. in Grams per 100 ml. of Water |
|---|---|---|
| 2-Lauroyl | Sodium (for comparison) | Less than 0.1. |
| 2-(alpha-Naphthyl) | N-Methylglucamine | 10.0. |
| 2-Lauroyl | do | 6.7. |
| 2-Decanoyl | do | 3.0. |

In testing these new products therapeutically, the amine salt was administered orally to guinea pigs. Administrations were made at 0, 6 and 24 hours, respectively, and the effect on "prothrombin time" determined at 30 hours.

In determining this prothrombin time, the animal plasma was used with standard technique and the results converted to percentage prothrombin. For this conversion, normal guinea pig plasma (100% prothrombin) is serially diluted with saline. The prothrombin times are determined for the various dilutions and plotted on a curve; 50% plasma, for example, represents 50% prothrombin. The prothrombin times of the treated animals are referred to the standard curve and the percent prothrombin is thus established under the conditions of the test. This value is subtracted from 100% prothrombin to show percent loss of prothrombin. The greater the percent loss of prothrombin, the more effective the anticoagulant. The responses for a variety of test levels of drug were plotted and the dosage (oral) in mg./kg. of animal (here guinea pig) was calculated which would effect a 50% reduction in prothrombin. This value is called $ED_{50}$ (effective dose for 50% prothrombin). The effectiveness of the compounds and the safety factor (difference between effective and lethal dosages) will be evident from Table II.

*Table II*

ANTICOAGULANT PROPERTIES OF COMPOUNDS ADMINISTERED ORALLY

| Compound Tested | $E.D._{50}$ mg./kg. | $LD_{min}$ mg./kg.[a] |
|---|---|---|
| 2-Phenyl-1,3-indandione (for comparison) | 46.5 | 50 |
| 2-alpha-naphthyl-1,3-indandione | 11.0 | 100 |
| 2-alpha-naphthyl-1,3-indandione N-methyl-glucamine salt | 18.5 (10.8)[b] | 300 (174) |
| 2-Lauroyl-1,3-indandione sodium salt | 9.5 | 80 |
| 2-Lauroyl-1,3-indandione N-methyl-glucamine salt | 9.4 (6.3) | 450 (300) |
| 2-Palmitoyl-1,3-indandione sodium salt | 25.0 | 200 |
| 2-Palmitoyl-1,3-indandione N-methyl-glucamine salt | 6.5 (4.5) | >1,000 (>700) |

[a] The $LD_{min}$ (the minimum lethal dose) was established subcutaneously in mice.
[b] Figures in parenthesis indicate the experimental dosage levels calculated as the free indandione.

The effective dose $ED_{50}$ is much smaller and the lethal dose $LD_{min}$ much larger than with the commercial anticoagulant phenyl indandione. These advantages coupled with the improved solubility of the N-methylglucamine salts render the compounds particularly useful as anticoagulants, i.e. hypoprothrombinemic agents.

EXAMPLE 5.—TABLETED COMPOSITION

For oral administration as an anticoagulant, i.e. to reduce coagulability, the N-methylglucamine salts made as described in Examples 1, 2, 3, and 4 are compounded alone or severally with nontoxic excipients and spacing agents disposed between and bonding the particles of the N-methylglucamine indandione salts. Examples of the excipients and spacing agents serving also as extenders in the finished tablets are gum acacia, starch, dextrin, carboxymethylcellulose sodium salt, corn syrup solids, and lactose, either alone or mixed, and suitably in total proportion in excess of the active anticoagulant.

An illustrative typical formulation, for a tablet of the compound made in Example 1, follows:

Tableting composition:
  25 g. 2-(alpha-naphthyl)-1,3-indandione-N-methylglucamine salt
  5 g. gum acacia
  10 g. potato starch
  54 g. lactose These materials are granulated with 50% aqueous isopropyl alcohol (that is, mixed to a semi-solid mass) and dried in a usual manner. Then 3 g. of talc and 3 g. of magnesium stearate are thoroughly admixed as parting materials and tableted as 200 mg. tablets containing 50 mg. of the active ingredient.

It will be understood that it is intended to cover all changes and modifications of the examples of the invention herein chosen for the purpose of illustration which do not constitute departures from the spirit and scope of the invention.

What is claimed is:

1. The N-methylglucamine salt of an indandione derivative selected from the group consisting of the enol forms of 2-(alpha-naphthyl)-1,3-indandione and 2-acyl-1,3-indandiones in which the acyl group contains 10 to 16 carbon atoms.

2. 2 - (alpha - naphthyl) - 1,3 - indandione N-methylglucamine salt, the indandione being in the enol form.

3. The N-methylglucamine salt of the enol form of a 2-acyl-1,3-indandione, the acyl group containing 10 to 16 carbon atoms.

4. 2-lauroyl-1,3-indandione N-methylglucamine salt, the indandione being in the enol form.

5. 2-palmitoyl-1,3-indandione N-methylglucamine salt, the indandione being in the enol form.

6. A hypoprothrombinemic agent comprising the salt of claim 1 and a nontoxic excipient admixed and bonded therewith.

7. The therapeutic process of reducing the coagulability of blood which comprises the oral administration of the salt of claim 1.

References Cited in the file of this patent
FOREIGN PATENTS 1,085,097    France _____ Jan. 27, 1955